(12) United States Patent
Saha et al.

(10) Patent No.: US 10,837,682 B2
(45) Date of Patent: Nov. 17, 2020

(54) DEVICES WITH HYBRID VAPOUR COMPRESSION-ADSORPTION CYCLE AND METHOD FOR IMPLEMENTATION THEREOF

(71) Applicants: Bidyut Baran Saha, Fukuoka (JP); Kyaw Thu, Singapore (SG); Deepak Pahwa, Delhi (IN); Rajan Sachdev, Delhi (IN); Kuldeep Singh Malik, New Delhi (IN)

(72) Inventors: Bidyut Baran Saha, Fukuoka (JP); Kyaw Thu, Singapore (SG); Deepak Pahwa, Delhi (IN); Rajan Sachdev, Delhi (IN); Kuldeep Singh Malik, New Delhi (IN)

(73) Assignee: BRY-AIR [ASIA] PVT. LTD., Delhi (IN)

( * ) Notice: Subject to any disclaimer, the term of this patent is extended or adjusted under 35 U.S.C. 154(b) by 0 days.

(21) Appl. No.: 16/063,388

(22) PCT Filed: Dec. 19, 2016

(86) PCT No.: PCT/IN2016/000290
§ 371 (c)(1),
(2) Date: Jun. 18, 2018

(87) PCT Pub. No.: WO2017/103939
PCT Pub. Date: Jun. 22, 2017

(65) Prior Publication Data
US 2018/0372382 A1 Dec. 27, 2018

(30) Foreign Application Priority Data
Dec. 18, 2015 (IN) .......................... 4154/DEL/2015

(51) Int. Cl.
*F25B 25/02* (2006.01)
*F25B 13/00* (2006.01)
(Continued)

(52) U.S. Cl.
CPC .............. *F25B 25/02* (2013.01); *F25B 13/00* (2013.01); *F25B 17/04* (2013.01); *F25B 17/083* (2013.01);
(Continued)

(58) Field of Classification Search
CPC ....... Y02A 30/278; Y02B 30/64; F25B 25/02; F25B 13/00; F25B 29/003; F25B 17/086;
(Continued)

(56) References Cited

U.S. PATENT DOCUMENTS 5,038,574 A * 8/1991 Osborne ................. F25B 15/06
62/101
2003/0221438 A1 12/2003 Rane et al.
(Continued)

FOREIGN PATENT DOCUMENTS

EP 0 515 923 12/1992
JP 2005-090825 4/2005

OTHER PUBLICATIONS

International Search Report for PCT/IN2016/000290 dated May 4, 2017, 3 pages.
(Continued)

*Primary Examiner* — Emmanuel E Duke
(74) *Attorney, Agent, or Firm* — Nixon & Vanderhye P.C.

(57) ABSTRACT

The present invention provides a device with a combined hybrid mechanical vapour compression-adsorption cycle, particularly to devices used in moisture or temperature control applications which incorporate or embody refrigeration or heat pump cycles, such as for example HVAC applications. In this invention, heat from the adsorption
(Continued)

process and/or condensation process of the adsorption cycle is pumped to the desorption process. Thus, this new hybrid combined cycle becomes a partially or fully electricity driven heat pump cycle.

43 Claims, 6 Drawing Sheets

(51) Int. Cl.
 *F25B 17/04* (2006.01)
 *F25B 17/08* (2006.01)
 *F25B 40/02* (2006.01)
 *F25B 41/04* (2006.01)
 *F25B 49/04* (2006.01)

(52) U.S. Cl.
 CPC ............ *F25B 40/02* (2013.01); *F25B 41/046* (2013.01); *F25B 49/046* (2013.01); *F25B 2339/047* (2013.01); *Y02A 30/278* (2018.01); *Y02B 30/64* (2013.01)

(58) Field of Classification Search
 CPC ........ F25B 17/04; F25B 17/083; F25B 40/02; F25B 41/046; F25B 49/046; F25B 2339/047
 See application file for complete search history.

(56) References Cited

U.S. PATENT DOCUMENTS

2012/0324931 A1* 12/2012 Alden .................... F25B 27/00
 62/157
2014/0102122 A1* 4/2014 Aso ...................... F25B 17/083
 62/101

OTHER PUBLICATIONS

Written Opinion of ISA for PCT/IN2016/000290 dated May 4, 2017, 6 pages.

* cited by examiner

DEVICES WITH HYBRID VAPOUR COMPRESSION-ADSORPTION CYCLE AND METHOD FOR IMPLEMENTATION THEREOF

This application is the U.S. national phase of International Application No. PCT/IN2016/000290 filed Dec. 19, 2016 which designated the U.S. and claims priority to IN Patent Application No. 4154/DEL/2015 filed Dec. 18, 2015, the entire contents of each of which are hereby incorporated by reference.

The present invention relates to a device with a hybrid vapour compression-adsorption cycle, particularly to devices used in moisture or temperature control applications which incorporate or embody refrigeration or heat pump cycles. In this invention, heat from the adsorption process and/or condensation process of the adsorption cycle is pumped to the desorption process. Thus, this new hybrid combined cycle becomes a partially or fully electricity driven heat pump cycle.

One example of application of the invention is in field of refrigeration devices where the purpose is to significantly improve and increase current cooling performance of a device by combining conventional mechanical vapour compression cycle with an adsorption cycle.

The present invention rests on the creation of a new hybridised mechanical vapour compression-adsorption cycle by the first two named inventors herein. This new hybrid combined cycle is referred to in this document as inter alia, the "Saha—Thu Cycle" for ease of reference. This newly created cycle is flexible in its applicability to a range of devices which are used in moisture or temperature control applications involving a heat pump cycle and adsorption cycle, such as HVAC applications.

BACKGROUND TO THE INVENTION

Refrigeration units which work on a mechanical refrigeration cycle wherein condenser unit and an evaporator unit are connected to each other through an electric compressor and a refrigerant line are well known. Vapour compression systems essentially comprise a condenser unit to cool the working fluid down and circulate it to an evaporator unit that is in direct thermal contact with the atmosphere/space to be cooled. The used working fluid is recycled back to the condenser unit through an electric compressor unit [1-4].

Heat operated cooling systems are also known in the art which use vapour absorption or vapour adsorption as the working principle [5-8]. Such systems are generally known only for unitary units where the condenser and the evaporator unit necessarily are provided in the same housing. The adsorber or absorber refrigeration cycle utilized in such systems comprises replacement of the compressor of the mechanical refrigeration cycle with an absorber- or adsorber-based heat exchangers[5,9,10]. There does not appear to have been any attempt to combine conventional mechanical vapour compression cycle with an adsorption cycle and utilize heat generated in system for system functioning, thereby having enhanced heat utilization and cooling performance.

WO 2009/145278 discloses a hybrid refrigeration system where mechanical work load in a vapour compression refrigeration cycle is reduced. A hybrid refrigeration system is formed by a combination of a vapour compression refrigeration cycle having a compressor, a condenser, an expander, and an evaporator and of an adsorption refrigeration cycle having at least a pair of adsorbers for adsorbing refrigerant whilst other desorbing adsorbed refrigerant simultaneously and switching alternately in next cycle. The adsorption refrigeration cycle is combined with vapour compression refrigeration cycle so that compression pressure of compressor in vapour compression refrigeration cycle is reduced. This art relates to improving efficiency of mechanical vapour compression chillers by reducing compression load for compressor with adsorption system. The adsorption system requires separate cooling for adsorption process and heating for desorption process. In other words, two systems namely, mechanical vapour compression (MVC) and adsorption (AD) are in series connection i.e., refrigerant movement is in series across the mechanical and thermal compressors. Cooling energy is extracted from evaporator of MVC whilst reduction in the compression ratio is achieved by reducing discharge pressure of mechanical compressor.

EP 2775236 discloses a system for increasing current cooling performance of a refrigerator by adding an adsorption cycle with vapour compression cycle in household type refrigerators. This disclosure provides an adsorption system used in household type refrigerators and a closed loop which work completely independent from vapour compression cycle and are added to system in addition to vapour compression cycle. The focus of this disclosure is on enhancement of evaporation capacity of a household refrigerator using 2 evaporators namely: (1) MVC evaporator, and (2) AD evaporator. Separate cooling for adsorption and condensation process is required. Switching between adsorption and desorption processes is not described and figures provided therein (FIGS. 1, 2, and 3) do not facilitate the process.

There are disclosures in the art where attempts have been made to hybridise vapour compression cycle with absorption cycle. For example, U.S. Pat. No. 9,239,177 discloses a hybrid absorption-compression chiller where a vapour compression system providing refrigeration effect in a primary evaporator for heat extraction from a cooling medium in a condensed primary refrigerant is used in addition with a vapour absorption system. However, the focus in this disclosure is solely on vapour compression cycle and absorption cycle, and there is no reference to a hybrid combined mechanical vapour compression—adsorption cycle.

U.S. Pat. No. 7,926,294 discloses a heating and cooling system to maintain an area at a desired temperature by the use of a thermoelectric device in a vapour compression system and the use of a control mechanism connected to both to ensure control over heating and cooling. The focus in this disclosure is on use of thermoelectric means to enhance cooling performance.

Japanese Patent Publication 2012-037203 discloses a system for cooling and recovering exhaust heat of an electronic apparatus. This system is a steam compression type freezer, with an evaporator for directly cooling heating element of a heating apparatus, and an adsorbent freezer with adsorbents. The condenser of steam compression type freezer and absorbent for desorption of adsorbent freezer is thermally coupled with each other through a heat medium such as heating water which circulates in a heat recovery pipe. Thus, a steam desorption process by absorbent is formed. In the evaporator, where steam is generated to be adsorbed by the adsorbent for adsorption, it is cooled by cooling action accompanying heat of vaporisation to generate cooling water. This cooling water is utilised for cooling. However, in this disclosure energy is recovered externally and the system is dependent on external cooling source.

Prior art attempts have hitherto focused on combining an adsorption cycle with a mechanical vapour compression cycle in order to improve or enhance the performance of the vapour compression cycle. To the best of the inventors' knowledge there does not appear to be any attempt to combine a conventional mechanical vapour compression cycle with an adsorption cycle which would provide benefits in terms of improvement in performance efficiency across a range of devices which are used in moisture or temperature control operations by improving the performance of the adsorption cycle in a heat pump cycle operation. Simply put, there does not appear to be any disclosure of use of a mechanical vapour compression cycle in order to eliminate/ minimise need for external heating or cooling circuits in an adsorption cycle in order to, for example, regenerate the adsorbent used therein.

While the above disclosure of prior art is with reference to refrigeration equipment, it must be understood that the scope of the art includes cooling, heating, and/or moisture control equipment as well and other equipment were either or both of above are required. For example, the principle underlying the present invention also has application in desalination equipment. Searches conducted have not resulted in any material prior art being located which cover use of a combination/hybridising of conventional mechanical vapour compression and adsorption cycles in a cooling, heating, and/or moisture control device.

OBJECTS OF THE INVENTION

The main object of the present invention is to provide a heat pump cycle combining/hybridizing conventional mechanical vapour compression cycle and adsorption cycle which facilitates enhanced performance in cooling, refrigeration or heating.

It is another object of the invention to provide a device and method for increasing the current cooling performance of a refrigeration device by combining/hybridising a conventional mechanical vapour compression cycle with an adsorption cycle.

Another object of the invention is to use under-utilised or unutilised heat from a condenser unit for an adsorption cycle integrated within the system in addition to using a standard vapour compression cycle as a cooling and heating source, thereby enabling more efficient performance of the same device.

Another object of the present invention is to increase the cooling performance of the system without altering the cycle features such as compressor power and evaporator efficiency. Another object of the invention is to increase cooling performance by combining and/or hybridising a mechanical vapour compression cycle with an adsorption cycle, operble in an environmentally friendly manner as targeted refrigerants are natural/low GWP (global warming potential) based compounds such as HFO blends (HFO-1234ze & HFO-1234yf) and HFC-32 etc.

SUMMARY OF THE INVENTION

The objects of the present invention are achieved by utilising a hybrid vapour compression cycle wherein a conventional mechanical vapour compression cycle is combined with an adsorption cycle in the manner described hereinafter, and implemented in devices where the Saha-Thu cycle can be used.

Accordingly, the present invention provides a device with a refrigeration or heat pump cycle comprising a combination of a mechanical vapour compression cycle and an adsorption cycle, the device further comprising:

a first working fluid capable of being adsorbed and/or desorbed in an adsorption means;

said adsorption means comprising two or more adsorption/desorption beds;

said adsorption/desorption beds being connected to an evaporator means and to a condenser means through one or more dedicated direction altering means, and operable in an alternating manner a vapour compression unit to compress a second working fluid, the MVC refrigerant, and connected to the said two or more adsorption/desorption beds, which alternatively act as the condenser and evaporator of the mechanical vapour compression unit, the condenser providing the regeneration heat to the desorber bed of the adsorption section, and the evaporator providing the cooling to the adsorber bed of the adsorption section, wherein the heat pump cycle recirculates the heat comprising adsorption heat and/or desorption heat internally for the adsorption cycle.

In one embodiment of the invention, a mechanical means is provided to pump the heat, in part or in full.

In another embodiment of the invention, a mechanical means is provided to pump heat from adsorber bed to desorber for desorption in full or in partial heat recycling mode.

In yet another embodiment of the invention, the device is provided with means for pumping heat from both the adsorber and the condenser means for desorption, and if desired, excess energy is rejected using an external circuit via water or air cooling technique. In another embodiment of the invention, the mechanical vapour compression cycle refrigerant carries the heat of adsorption in partial heat pumping configuration, and condensation in full heat recirculation mode, to be pumped to the desorption process.

In another embodiment of the invention, the adsorbent pair for the adsorption cycle is selected from the group consisting of silica gel+water, activated carbon+ethanol, and activated carbon+HFCs and operating pressure is in the range from vacuum to high pressure.

In another embodiment of the invention, a mechanical pump, employed to recycle heat in the adsorption cycle, is selected from the group consisting of centrifugal compressors, screw compressors, reciprocating compressors and scroll compressors.

In another embodiment of the invention, the refrigerant in the MVC comprises any conventional refrigerant or a mixture of conventional refrigerants.

In another embodiment of the invention, the dedicated direction changing means for altering flow of the MVC refrigerant thereby enabling direction change between adsorption and desorption beds, is preferably a 4-way valve.

In another embodiment of the invention, if desired, an external cooling mechanism such as water or air via a heat exchanger can be provided for the refrigerant sub-cooling.

In another embodiment of the invention, if desired, part of the cooling energy from evaporator of adsorption cycle via a heat exchanger can be provided for refrigerant sub-cooling.

In another embodiment of the invention, if desired, a heat carrier circuit or an energy storage means is provided to enable heat exchange between the adsorption cycle and the MVC.

In a further embodiment of the invention, the energy storage means comprises a cold/heat tank with thermal exchange media such as liquids or phase change materials.

In another embodiment of the invention, means are provided to enable control of sorption processes by adjustment of refrigerant flowing direction within the MVC.

In another embodiment of the invention, means are provided to control operation of adsorber and desorber through control of refrigerant flow control means provided connecting the adsorption and desorption beds and the condenser means and the evaporator means.

In another embodiment of the invention, the condenser heat from the adsorption cycle is rejected externally by cooling water.

In yet another embodiment of the invention the condenser heat from the adsorption cycle is rejected externally by air.

In a further embodiment of the invention, the device is selected from a chiller device, a split air conditioning unit, a refrigeration unit, and the like.

The present invention also provides a method for heat pump operation in a device with a refrigeration or heat pump cycle comprising a combination of a mechanical vapour compression cycle and an adsorption cycle, the device comprising:

a first working fluid capable of being adsorbed and/or desorbed in an adsorption means;

said adsorption means comprising two or more adsorption/desorption beds;

said adsorption/desorption beds being connected to an evaporator means and to a condenser means through one or more dedicated direction altering means, and operable in an alternating manner a mechanical vapour compression unit to compress a second working fluid, the MVC refrigerant, and connected to the said two or more adsorption/desorption beds, which alternatively act as the condenser and evaporator of the mechanical vapour compression unit, the condenser providing the regeneration heat to the desorber bed of the adsorption section, and the evaporator providing the cooling to the adsorber bed of the adsorption section, wherein the heat pump cycle provides the useful heat effect (pump the adsorption heat for the desorption process) for the adsorption cycle, the method comprising employing the vapour compression means to pump heat in the process to the sorption processes to regenerate the adsorbent therein, thereby providing an enhanced effect/output.

In one embodiment of the invention, the heat, in part or in full is pumped with a mechanical means.

In another embodiment of the invention, the adsorber heat for desorption in full or in partial heat recycling mode is pumped mechanically.

In yet another embodiment of the invention, heat from both the adsorber and the condenser means are pumped for desorption.

In another embodiment of the invention, heat of adsorption in full, or partially, and condensation in full heat recirculation mode, are pumped to the desorption process through the refrigerant.

In another embodiment of the invention, the adsorbent pair for the adsorption cycle is selected from the group consisting of silica gel+water, zeolite+water, activated carbon+ethanol, activated carbon+methanol (operation at low pressure or partial vacuum), and activated carbon+HFCs, activated carbon+propane, activated carbon+n-butane (high pressure operation) and the operating pressure is in the range of from vacuum to high pressure.

In another embodiment of the invention, the mechanical pump to recycle heat from the adsorption cycle is selected from the group consisting of centrifugal compressors, screw compressors, reciprocating compressors and scroll compressors.

In another embodiment of the invention, the refrigerant comprises any conventional refrigerant or a mixture of conventional refrigerants such as R134a, R410a, $CO_2$, HFO-1234ze(E) and HFO-1234yf, etc.

In another embodiment of the invention, heat pump direction change between adsorption and desorption beds is effected through dedicated direction altering means for flow of refrigerant.

In another embodiment of the invention, if desired, refrigerant is subjected to sub-cooling through an external cooling mechanism such as water or air via a heat exchanger.

In another embodiment of the invention, if desired, heat exchange between the adsorption cycle and the mechanical vapour compression cycle is enabled through a heat carrier circuit or an energy storage mechanism such as a cold/hot storage tank with thermal exchange media such as liquids or phase change materials.

In yet another embodiment of the invention, refrigerant flow and sorption process are controllable through dedicated control means.

In another embodiment of the invention, the method provides for maintaining a pressure equalization between the high pressure and low pressure sides of the mechanical vapour compression (MVC) cycle for energy recovery and for the protection of the compressor.

In another embodiment of the invention, in the method the sub-cooling of the refrigerant is attained by using part of the cooling energy from the evaporator of the adsorption cycle via the chilled water running across the sub-cooling heat exchanger.

In another embodiment of the invention, in the method the sub-cooling of the refrigerant is attained by using air via the sub-cooling heat exchanger.

In another embodiment of the invention, in the method the sub-cooling of the refrigerant is achieved by using part of the cooling energy from the evaporator of the adsorption cycle with a separate heat exchanger submerged inside the evaporator of the adsorption cycle and heat carrier circuit running across that heat exchanger and the sub-cooling heat exchanger.

In another embodiment of the invention, in the method the sub-cooling of the refrigerant is obtained by expanding a part of the refrigerant of the MVC cycle.

In another embodiment of the invention, in the method an intermediary medium/media such as heat carrier circuit or energy storage scheme such as cold/hot tank with thermal exchange media such as liquids or phase change materials is utilized to exchange the heat between the adsorption cycle and the MVC cycle.

In another embodiment of the invention, in the method the operation interval/timing for the sorption processes are controlled by the adjustment of the refrigerant flowing direction of the MVC cycle.

In another embodiment of the invention, in the method the preconditioning interval or schedule of the adsorber and the desorber is controlled via the alteration of the vapour valves commuting the sorption heat exchangers and the respective evaporator and condenser of the adsorption cycle.

In another embodiment of the invention, the condenser heat from the adsorption cycle is rejected externally by cooling water.

In yet another embodiment of the invention the condenser heat from the adsorption cycle is rejected externally by air.

The above and other embodiments of the invention not expressly discussed hereinabove are explained with reference to the accompanying drawings, following description and accompanying examples.

BRIEF DESCRIPTION OF THE DRAWINGS

Details on the embodiments of the present invention will now be elaborated in an exemplary manner only with reference to the accompanying drawings where.

DETAILED DESCRIPTION OF THE INVENTION

Figure 1:
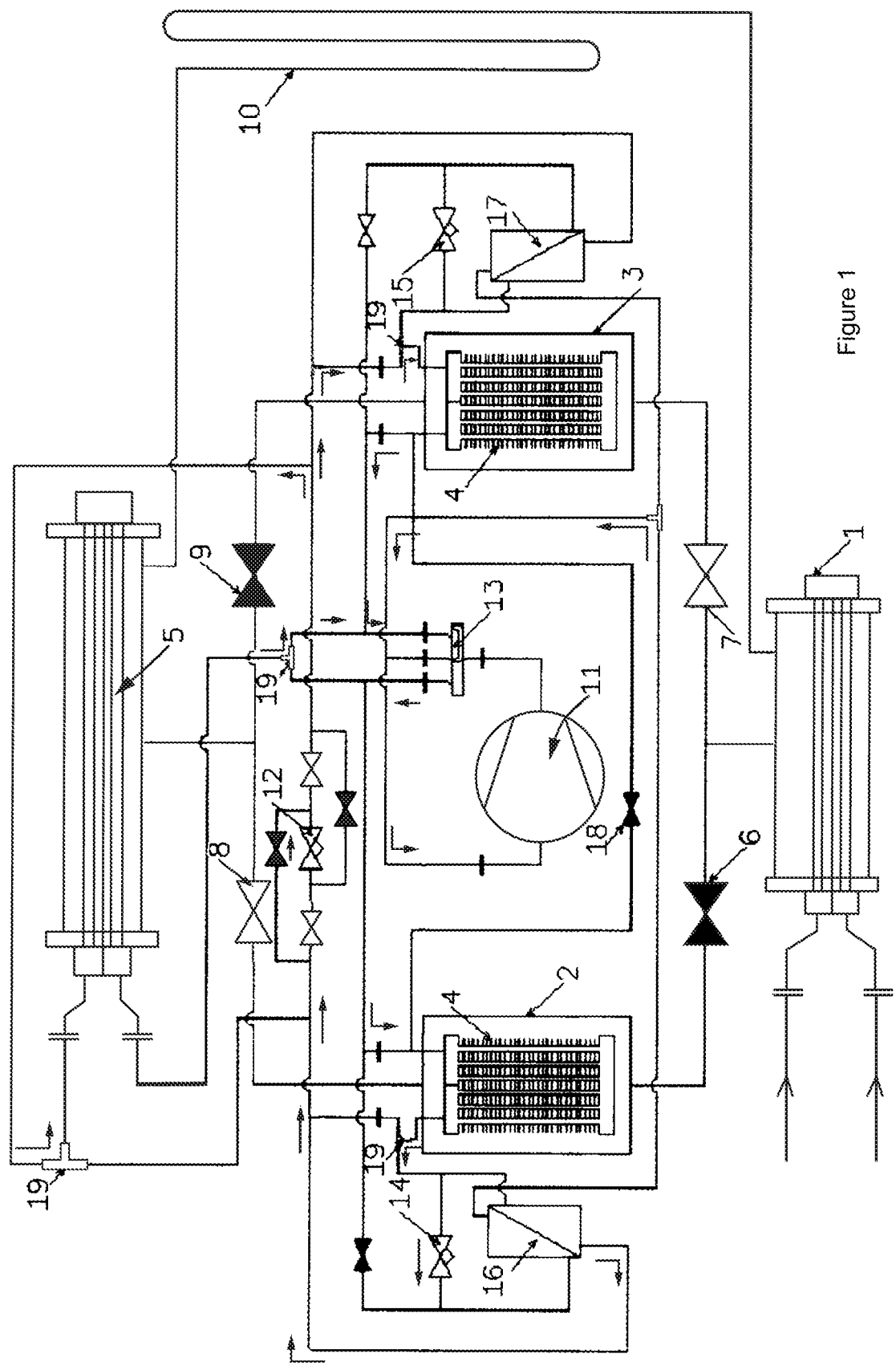
FIG. 1 shows the schematic diagram of the heat pump cycle that hybridizes an adsorption cycle with the mechanical vapour compression (MVC) cycle where the MVC cycle pumps heat from the adsorber bed and the condenser to the desorber bed internally with one half cycle operation.

As stated above, the present invention relates to and utilises a refrigeration or heat pump cycle that hybridizes a conventional mechanical vapour compression and an adsorption cycle. The seemingly low efficiency of each cycle individually is overcome by amalgamation with the other. The mechanical vapour compression cycle is employed for internal heat pumping from an adsorber bed and/or a condenser to a desorber bed in an adsorption cycle whilst cooling energy is produced from the evaporator of the adsorption cycle. An external heat source as is required in prior art (for example a hot water circuit), is no longer required for regeneration of the adsorbent. This effectively makes the cycle portable since readily available electricity can be utilized to operate the compressor. This is one of the significant advantages of the present invention.

The present invention essentially provides for the development of a heat pump cycle wherein an adsorption process serves as the cycle for providing useful effects such as but not limited to cooling, refrigeration, dehumidification, heating or desalination etc. whilst a mechanical vapour compression (MVC) cycle is employed to pump or recirculate heat within the adsorption cycle, and in the implementation of this heat pump cycle in devices/equipment utilised in these fields of technology. The inventive step lies inter alia, in the combination and application of a mechanical vapour compression cycle in shifting the heat internally within an adsorption cycle.

According to a first aspect of the invention, the cycle comprises of adsorption heat pump which can utilize a number of adsorbate+adsorbent pairs such as but not limited to silica gel+water, activated carbon+ethanol, activated carbon+methanol, activated carbon+HFCs whilst the operating pressure may range from vacuum to high pressure. The heat in the adsorption cycle is recirculated by mechanical means including, but not limited to centrifugal compressors, screw compressors, reciprocating compressors and scroll compressors whilst a refrigerant of any kind or mixtures may be employed as working fluid. The heat recirculation can be achieved by direct means where the refrigerant of the mechanical vapour compression (MVC) cycle is in direct heat transfer with the adsorption/desorption process, or indirect mean using an intermediary such as heat exchanger or storage facilities.

The heat pump cycle includes heat exchangers. As an example, one heat exchanger is provided for the extraction of cooling load where one side may be in direct communication/contact with the cooling medium such as chilled water or air whilst the refrigerant of the adsorption process evaporates. Two heat exchangers serve as adsorber beds where adsorbent is in thermal communication whilst the other side is in thermal interaction with the evaporation/condensation of the refrigerant of the MVC cycle, and a heat exchanger for the condensation of the refrigerant of the adsorption cycle. The heat exchanging side of the adsorber heat exchangers can be inverted i.e., the refrigerant of the MVC cycle can be either in the tube-side of shell side while the adsorbent material is on the opposite side of the heat exchanger. In this embodiment, external cooling source is employed for the adsorption cycle to condense the refrigerant which is recycled back to the evaporator of the cycle via an expansion/pressure balancing device.

The adsorbent materials are preferably coated or packed around the heat exchanging surfaces on one side of the adsorber heat exchanger which is enclosed inside a chamber/compartment in communication with the evaporator and the condenser of adsorption cycle via isolating valves. The other side of the adsorbent heat exchanger serves as evaporator during adsorption process whilst as condenser in the desorption process for the mechanical vapour compression cycle.

The adsorption and desorption processes are carried out till pre-set time or saturation conditions. The process is followed by a switching process where the adsorber bed that previously performs adsorption process is heated whilst its counterpart is cooled and here both heating and cooling are achieved by the mechanical vapour compression cycle where the switching in this cycle is processed by adjusting a 4-way valve and expansion device. In the first phase of each process, the adsorbent side of the heat exchanger is isolated from its evaporator and condenser. Here the cycle time is controlled by the operation of the 4-way valve in the mechanical vapour compression (MVC) cycle whilst the switching time is controlled by the adjustment of the vapour valves commuting the adsorber side with the evaporator and condenser.

The pressures of the condenser side and the evaporating side of the MVC are preferably equalized prior to the switching of the 4-way valve. This pressure equalization may be achieved by a number of valve adjustments of the MVC cycle or using a separate pressure equalization line with a control valve whilst this process may undergo from a short period or till the equalized or preferred pressure condition is attained.

Another embodiment employs the MVC cycle to pump the heat from the adsorption and condensation processes to the desorption process of the adsorption cycle. The adsorber heat exchanger configurations remain similar to the previous embodiment whilst one side of the condenser heat exchanger of the adsorption cycle is now in thermal communication with the MVC cycle. The excess energy is rejected via heat exchanger by means of air or cooling water.

If desired, sub-cooling of the refrigerant at the exit of the adsorber heat exchanger is achieved by an external cooling using a cooling water circuit via a heat exchanger. The refrigerant can be arranged so that sub-cooling from either adsorbent heat exchanger is done using one heat exchanger.

The cooling source for the sub-cooling of the refrigerant from the desorber is extracted from the cooling energy of the adsorption cycle. This is achieved by extracting some portion of the chilled water and running across the sub-cooling heat exchanger.

The cooling energy for the sub-cooling is preferably extracted from the evaporator of the adsorption cycle utilizing a separate heat carrier circuit where some part is inserted/submerged in the evaporator whilst the energy carrier medium runs across the sub-cooling heat exchanger.

Alternatively, the sub-cooling of the refrigerant is achieved by expanding the refrigerant from the MVC cycle using separate mechanism such as an expansion device or capillary tube.

Turning now to the figures, which exemplify some of the embodiments of the invention:

FIG. 1 shows the schematic diagram of heat pump cycle that hybridizes an adsorption cycle with a mechanical vapour compression (MVC) cycle. The system includes adsorption cycle for useful effects (cooling, refrigeration, dehumidification, heating and desalination) and MVC cycle to recirculate heat internally within adsorption cycle by mechanical means.

The adsorption cycle includes an evaporator 1 where the cooling effect (chilled water or refrigeration) is extracted from the evaporation of the refrigerant from the adsorption cycle. The adsorption cycle comprises two adsorber reactors or beds 2 and 3 where the shell side is coated with the adsorbent materials 4 on the fin and the tube surfaces. The working adsorbent+adsorbate pair can be silica gel+water, activated carbon+ethanol, activated carbon+methanol, activated carbon+HFCs whilst the operating pressure may range from vacuum to high pressure depending on the working nature of the selected pair. The adsorption cycle also consists of a condenser 5 for the condensing the refrigerant of the adsorption cycle.

The adsorber beds/chambers are in direct vapour communication with the evaporator 1 and the condenser 5 via the vapour valves 6, 7, 8 and 9. Due to the nature of the adsorbent materials that can only perform either adsorption or desorption at a certain time, two adsorber beds/chambers 2 and 3 are employed to perform adsorption and desorption processes alternatively. Here, adsorber bed 3 performs adsorption process where it is commuted to the evaporator via the vapour valve 7 whilst it is isolated from the condenser 5 by closing the vapour valve 9. The vapour uptake by the adsorbent materials inside the adsorber bed/chamber 3 initiates the evaporation of the refrigerant inside the evaporator) where useful effects such as cooling, refrigeration and/or dehumidification can be extracted. Adsorption process or the vapour uptake process is an exothermic process and thus the heat of adsorption must be removed from the adsorber bed 3 to maintain the adsorption process.

Concurrently, another adsorber bed/chamber 2, assumed to be previously subjected to an adsorption process, is isolated from the evaporator 1 by closing vapour valve 6 but connected to the condenser via the vapour valve 8 between them. Desorption process can be triggered by supplying energy in the form of heat since it is an endothermic process. Desorbed vapour is condensed by rejecting the condensation heat and the liquid refrigerant flows back to the evaporator via the pressure equalizing line or the U-tube 10.

The duration or the cycle time of adsorption/desorption process can be the time at which the adsorber bed becomes saturated or the desorber bed fully unsaturated or the time until the useful effect production becomes insignificant. In the next cycle, the saturated adsorber bed now bed 3 needs to be regenerated whilst the regenerated bed 2 will execute adsorption process by adjusting associated vapour valves. However, the pressure inside the bed 3 is at the evaporator 1 pressure which is at the saturation pressure of the refrigerant evaporating whilst the pressure inside the adsorber bed 2 is at the condenser 5 pressure which is relative higher as compared to the evaporation pressure. Thus, the pressures of these adsorber beds need to be preconditioned prior to their exposure to the respective evaporator or the condenser. This process is normally termed as the switching time during which the beds 2 and 3 are isolated from the evaporator 1 and the condenser 5.

In this cycle, the heat of adsorption and condensation heat are pumped for the desorption process by a mechanical vapour compression cycle. The excess energy rejection either by water or air cool mechanism is not shown here. The mechanical vapour compression (MVC) system consists of a compressor 11 which pumps the adsorption heat from the adsorber bed 3 undergoing adsorption process and the condenser 5 to the desorber bed 2 performing desorption process. In this configuration, the refrigerant of the MVC cycle flows in the tube side of the adsorber heat exchangers 2 and 3. The refrigerant is expanded through the expansion device 12 into the tube side of the adsorber heat exchanger 3 and the condenser 5. The refrigerant picks up the heat of adsorption and condensation transforming into the superheated vapour and flows or is sucked into the compressor 11 via the 4-way valve 13. The refrigerant discharge from the compressor 11 is sent to the adsorber bed 2 where the heat from the refrigerant is employed for the desorption process. The refrigerant from the desorber heat exchanger 2 is further subcooled by expanding a small portion of the liquid refrigerant through another expansion device 14 by the sub-cooling heat exchanger 16. The refrigerant is then expanded through the expansion device and the cycle is completed.

The cycle time for the adsorption and desorption processes is set by the duration of the 4-way valve position. At the end of the cycle operation, the adsorber beds/chambers 2 and 3 are first isolated from the evaporator 1 and the condenser 5 by closing the vapour valves 6, 7, 8 and 9. The pressure of the refrigerant sides of the MVC cycle i.e., the tube sides of the adsorber chambers/beds 2 and 3 are equalized through the pressure equalization line and valve 18 for a few seconds. The 4-way valve 13 is then switched and all 3-way valves 19, change their positions.

Figure 2:
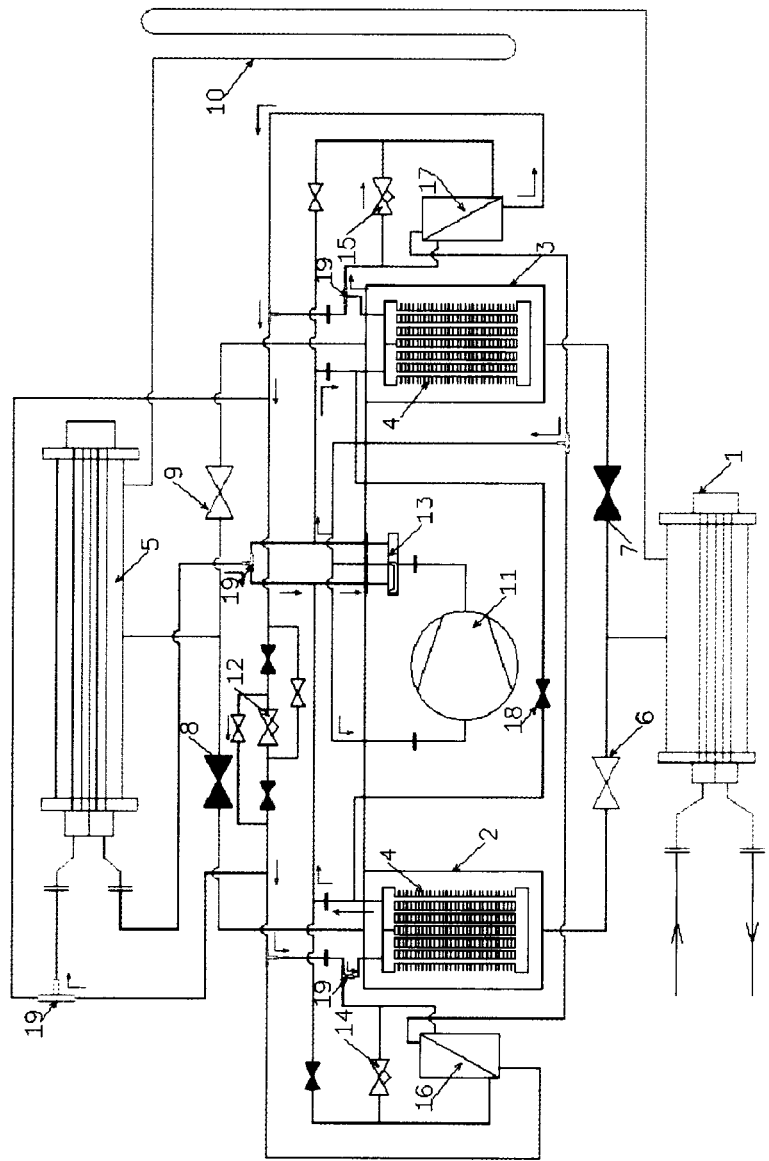
FIG. 2 depicts the schematic diagram of the heat pump cycle that hybridizes an adsorption cycle with the mechanical vapour compression (MVC) cycle where the MVC cycle pumps heat from the adsorber bed and the condenser to the desorber bed internally with the switching operation and the other half cycle operation.

FIG. 2 shows a schematic diagram for the next phase of operation. Here, adsorber bed, 2 is connected to the suction of a compressor, 11 whilst the tube side of another adsorber bed, 3 is provided with a discharge. However, vapour valves, 6, 7, 8 and 9 remain closed until the pressures in the shell side of the adsorber beds/chambers approach to the evaporation and condensation pressure of the refrigerant (adsorption cycle). The cycle continues by opening and closing respective vapour valves connecting between the adsorber beds/chamber, 2 and 3, and the evaporator, 1 or the condenser, 5 until the pre-set cycle time is attained.

Figure 3:
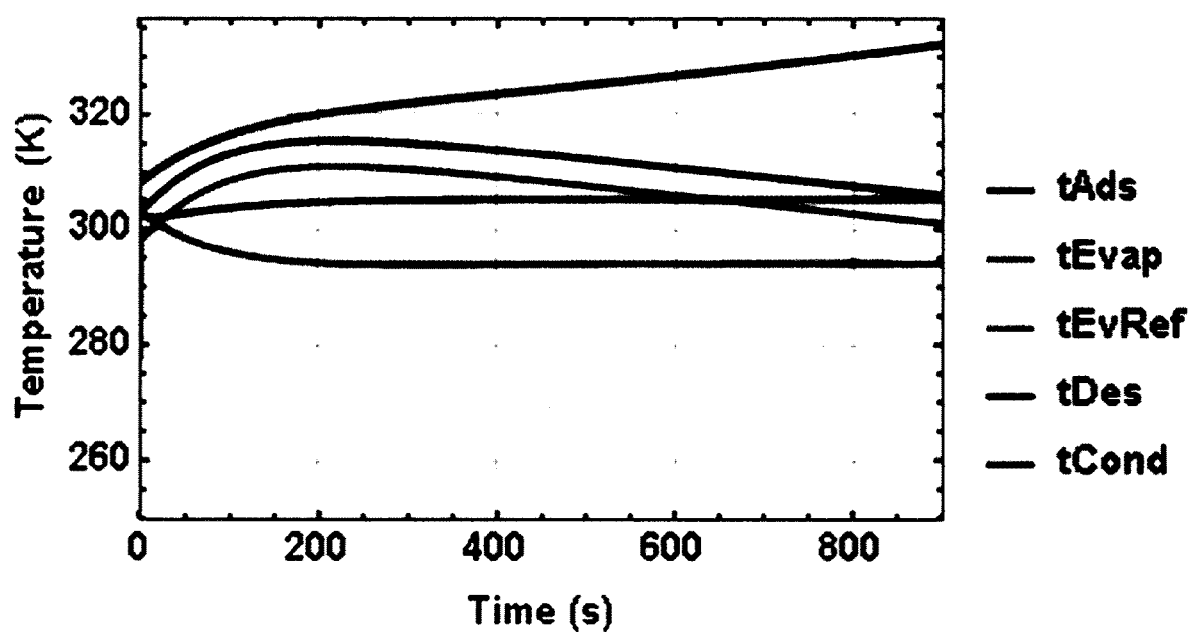
FIG. 3 illustrates the temperature profiles of the major components of the hybrid cycle based on the experimentally-verified results during cycle operation.

FIG. 3 shows the temperature profiles of the heat pump cycle that hybridizes a MVC cycle and adsorption cycle. This is based on profiling of the hybrid cycle using the conservation of mass and energy together with experimentally measured isotherm and kinetic properties of working pair. Here, silica gel+water is selected as the working pair for the adsorption cycle whilst the refrigerant for the MVC cycle is R134a. The temperatures of the adsorber bed and the evaporating temperature of the refrigerant initially increase due to the rapid adsorption process and subsequently higher heat of adsorption production. As the adsorbent becomes saturated as the adsorption process goes by, the temperature of the adsorber bed becomes lower gradually. The evaporator temperature of the adsorption cycle drops from the initial conditions of 303.15 K to around 293 K. The desorber bed temperature is quite low at the beginning of the desorption process because the energy supply to the initial desorption process is rather large and rapid during that period. The desorber temperature gradually increases as the cycle time commences since the bed becomes unsaturated gradually. Steady desorption process is reflected in the condenser temperature profile.

Figure 4:
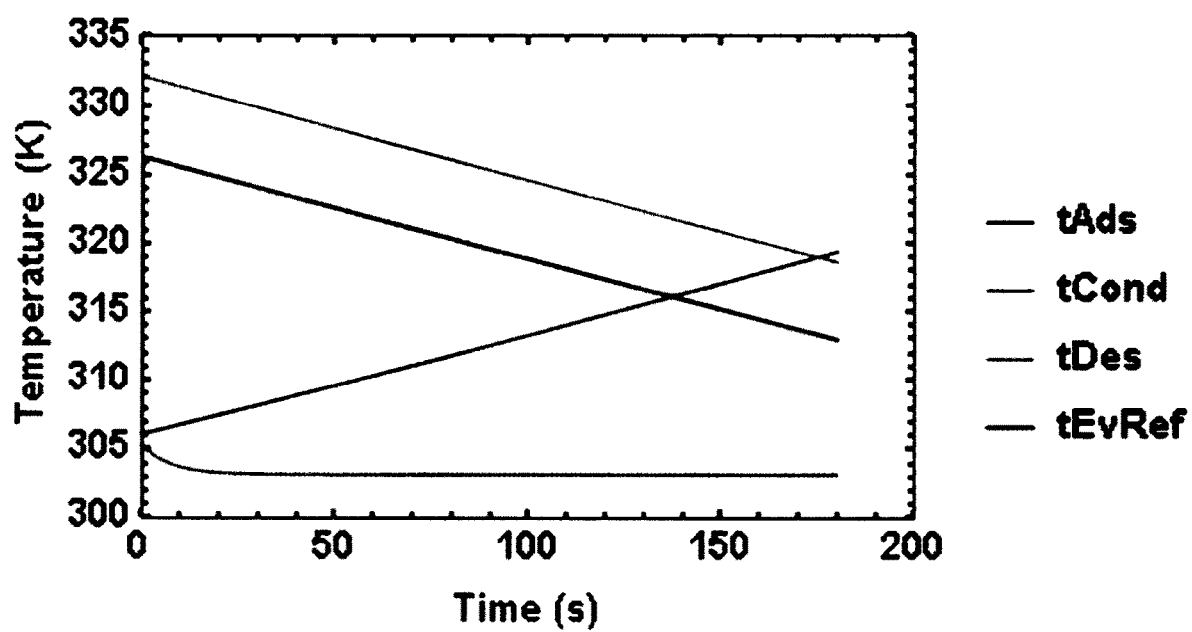
FIG. 4 provides the temperature profiles of the major components of the hybrid cycle during switching operation.

FIG. 4 shows the temporal temperature profiles of the adsorber, desorber, condenser (adsorption cycle) and the evaporator of the MVC cycle during the switching operation. It is noted that the adsorber bed needs to be precooled whilst the desorber bed requires to be preheated before commencing the next cycle. Sudden temperature jump in the evaporator of the MVC cycle is detected at the beginning of the switching operation due to the instant switching from the adsorber to the desorber bed by the 4-way valve. The temperatures of both the desorber and the evaporator of the MVC cycle come down as the switching time commences. The temperature of the adsorber bed which is being preheated rises from 306 K to almost 320 K after 180 seconds. It is noted that the pressure equalization scheme between the tube-sides of the adsorber and desorber are not implemented here and thus the switching time required is relatively long to attain preferable temperature and pressure conditions.

Figure 5:
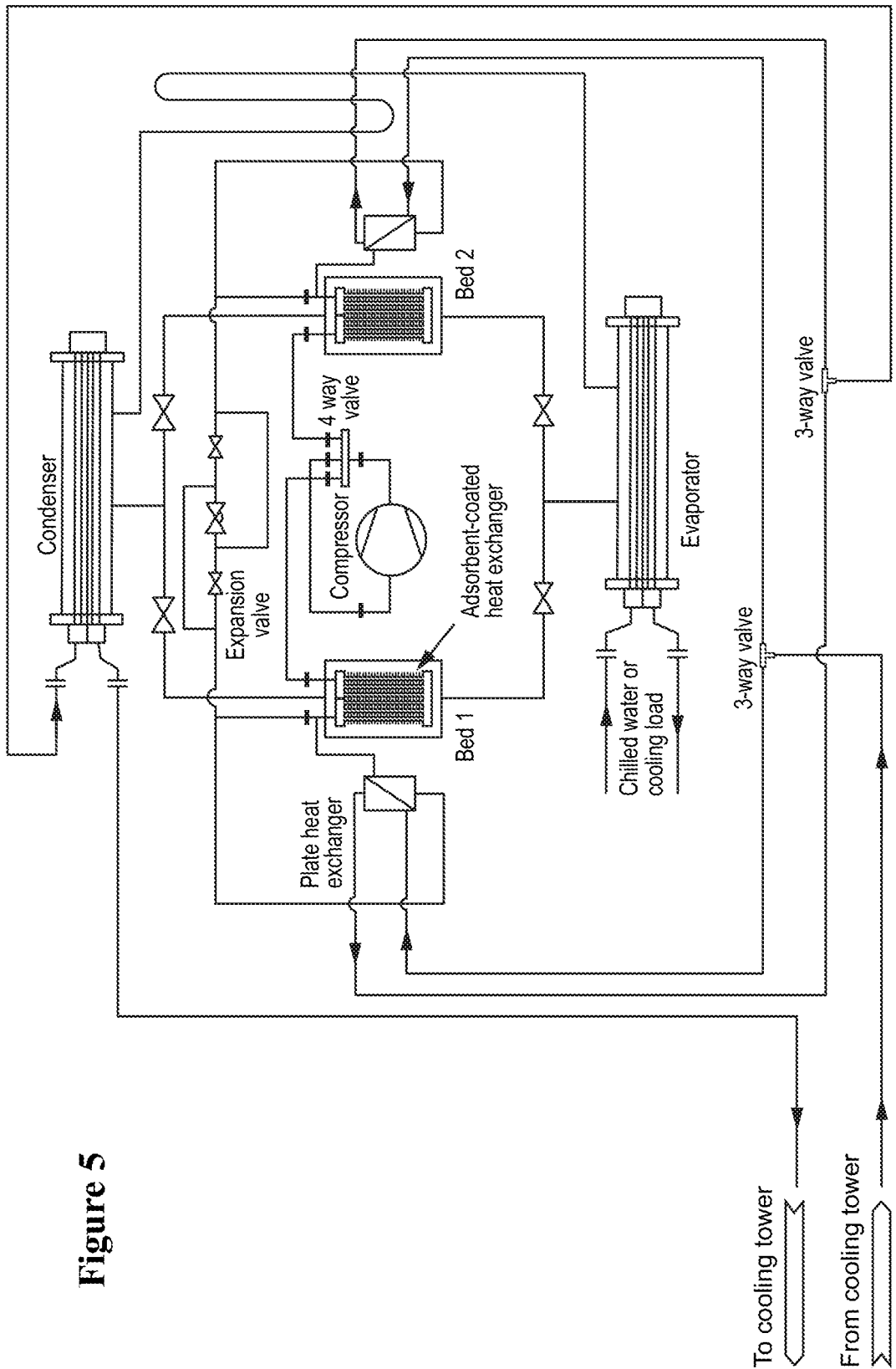
FIG. 5 is a schematic representation of one embodiment of the invention wherein heat from the adsorption bed of the adsorption cycle is pumped to the desorption bed using the compression cycle.

One embodiment of the present the invention is implemented as depicted in FIG. 5. In FIG. 5, heat from the adsorption bed of the adsorption cycle is pumped to the desorption bed using the mechanical vapour compression (MVC) cycle. In other words, the evaporation process of the MVC cycle is utilized to maintain the adsorption process which is an exothermic process. The condensation heat from the adsorption cycle and the energy from the mechanical vapour compression cycle i.e., the compression energy is rejected to ambient through a water- or air-cooled heat exchanger whilst realizing sub-cooling through an external cooling. The functioning of this embodiment is similar to that described with reference to FIGS. 1 and 2 above.

Figure 6:
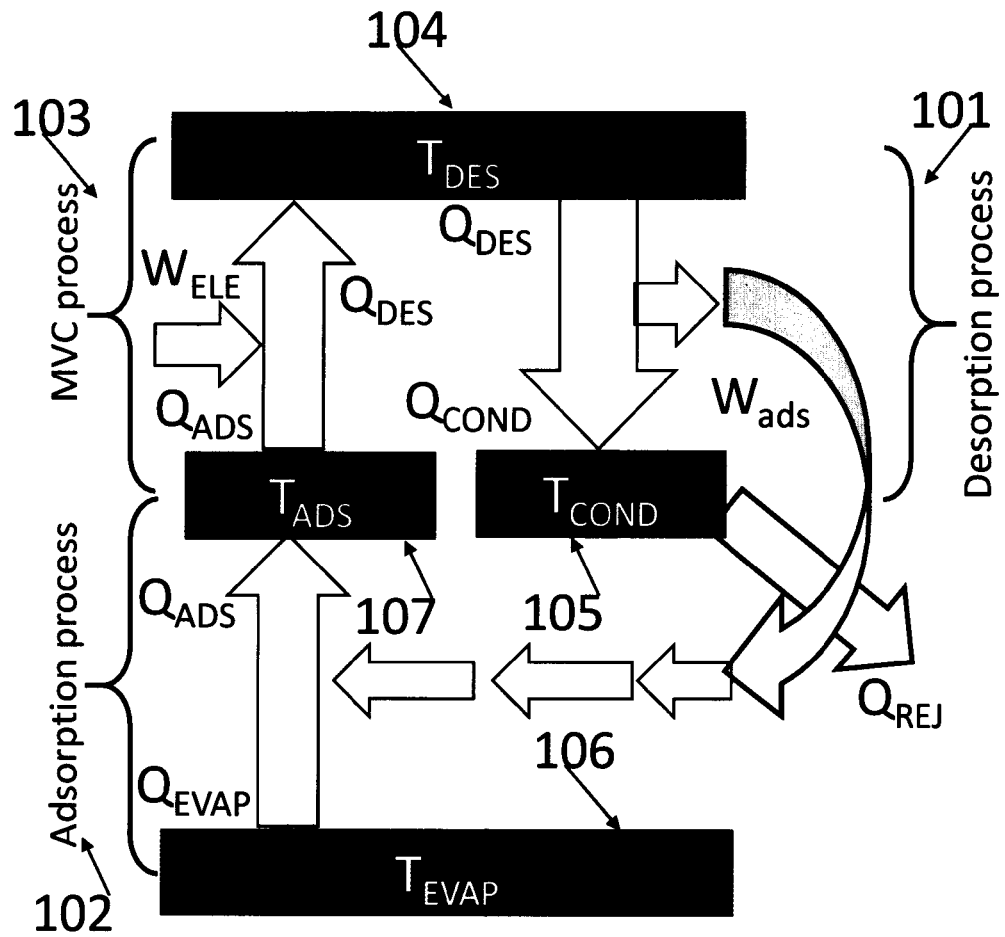
FIG. 6 depicts the energy flow and temperature diagram of the Saha-Thu cycle referred to herein.

The energy flow and temperature diagram of the present cycle is depicted in FIG. 6. The cycle consists of desorption process, 101, adsorption process 102 and MVC process 103. The work potential or the chemical potential of the adsorbent is created by the regeneration process i.e., desorption process, 101 using the heat source, 104 at desorption temperature whilst the regenerated vapour is condensed at condenser heat sink, 105. This desorption process, 101, which is a heat engine working between two temperature reservoirs, generates hypothetical work, $W_{ads}$. In the adsorption cycle, 102 which is essentially a heat pump cycle, $W_{ads}$ is employed to pump the heat from the heat source at $T_{EVAP}$, 106 to the heat sink at $T_{ADS}$, 107 utilizing the $W_{ads}$ generated by the said desorption cycle, 101. Here the chemical potential of the adsorbent is destroyed by undergoing the vapour uptake. Another heat pump cycle, i.e., the MVC process, 103 is employed to pump heat from the heat reservoir at $T_{ADS}$ to heat sink with temperature of $T_{DES}$. Here external electrical work is required to achieve this pumping action and the MVC process, 103 recirculates the heat inside the adsorption cycle. The cycle is then competed and hence it has become an electric driven heat pump cycle without external heat source.

The Saha-Thu Cycle embodied in the present invention has applicability across a wide range of devices that are used for either heating or cooling or both. All that is required is that such devices utilise a heat pump cycle or a refrigeration cycle based essentially on adsorption cycle. Combining of a mechanical vapour compression cycle with adsorption cycle significantly enhances performance of such devices/apparatus, and results in valuable energy savings as well.

EXAMPLES

In the present invention, the condensation process of the mechanical vapour compression cycle provides the heat source for the regeneration process of the adsorption cycle working in desorption mode. Thus, the combined cycle essentially eliminates the cooling and heating circuits to the adsorber beds of a conventional adsorption cycle and the system becomes significantly compact, portable and operational by electrically-driven compressor.

The present method of cooling and heating for adsorption, condensation and regeneration of adsorption cycle is applicable to any kind of adsorbent+adsorbate pairs.

The combined hybrid cycle discussed hereinabove and forming part of the invention provides superior coefficient of performance (COP) as compared to either conventional vapour compression cycle or adsorption cycle alone.

The present cycle offers superior performance as compared to a conventional mechanical vapour compression cycle or an adsorption or an absorption cycle. Thus, the cycle can potentially replace all the existing cooling production applications such as HVAC systems, residential/commercial cooling and automobile applications.

Example 1

The application of the present cycle to a chilled water system for a commercial building in a tropical climate conditions will be evaluated. The chilled water supply temperature for such application is normally maintained at 7° C. according to the AHRI standard whilst the condenser cooling water temperature is about 30° C. If the cooling were to be provided by an adsorption chiller driven by a heat source temperature of 65° C. at the same cooling water temperature, the maximum possible or Carnot COP is found to be about 0.72. Here, the evaporating temperature is taken as 6° C. (experimentally verified approach is 1° C.). If a conventional mechanical vapour compression cycle with R134a is applied, the maximum possible COP is about 6.4 where the experimentally measured evaporating temperature is about −1.2° C. (evaporator pressure=2.8 bar and superheat of 6.2° C.) and the condensing temperature is about 41° C. (Condenser pressure=10.5 bar). If the present cycle is applied, the maximum possible COP is found to be 9.6 keeping the same regeneration and adsorption temperatures for the adsorption cycle. The present cycle provides much superior energy efficiency in this scenario.

A simple calculation for COP of the system as compared to adsorption and mechanical vapour compression cycle using Carnot COP is presented in Table1 below. The condensation temperature of the MVC cycle is set at 80° C. whilst the evaporating temperature is 35° C. Thus, the regeneration temperature of the adsorption temperature is about 75° C. assuming the log mean temperature difference (LMTD) of the desorber to be 5° C. Similarly, the adsorption temperature is about 40° C. At these adsorption and desorption temperatures and typical adsorbent+adsorbate pair such as silica gel+water, the chilled water temperature that can be extracted from the adsorption cycle is about 7° C. whilst the evaporating temperature of the adsorption cycle is about 6° C.

TABLE 1

COP calculation of the hybrid cycle.

Hybrid MVC-AD cycle

| MVC cycle | | Adsorption Cycle | | MVC chiller | |
|---|---|---|---|---|---|
| Tcond (K) | 353.15 | Tdes (K) | 348.15 | Tcond | 314.799 |
| Tevap (K) | 308.15 | Tads (K) | 313.15 | Tevap | 272.6753 |
| LMTDc (K) | 5 | TcondAD (K) | 305.15 | | |
| LMTDe (K) | 5 | TevapAD (K) | 279.15 | | |
| Superheat (K) | 7 | | | | |
| Subcool (K) | 5 | | | | |
| COP_C (☒) | 7.85 | | 1.01 | | 6.47 |
| COP_Overall (☒) | | 7.96 | | | 6.47 |

Using these temperatures, the Carnot COPs for both MVC and adsorption cycles are found to be 7.85 and 1.01, respectively, whilst the overall COP of the proposed hybrid cycle is about 7.96. On the other hand, the Carnot COP of a MVC system for the production of 7° C. chilled water using the refrigerant R134a is calculated to be around 6.47.

It is observed that the proposed hybrid MVC-AD cycle provides better COP as compared to conventional MVC or AD cycles.

Significantly higher COP is realized from cycles for adsorbent+adsorbate pairs with lower regeneration temperatures, typically between 65° C. and 80° C. On the other hand, advanced coating method for adsorbent on the heat exchanger materials with improved heat and mass transfer can bring down the regeneration temperature as well.

The present invention is applicable to adsorption cycles with two adsorber beds to multi-bed systems such as 3-bed or 4-bed. For multi-bed scenarios, the refrigerant for the cooling and heating can be distributed to the adsorber beds accordingly, thus realizing adsorption and desorption processes.

Various material pairs (water-silica gel, water-zeolite etc.) can be used in the adsorption cycle of the present invention. The adsorption cycle subject to the invention operates in vacuum. It is a system independent from the current system (vapour compression cycle). This cycle system solely uses the heat from the condenser which otherwise is rejected to the ambient. Refrigerant fluids never mix to each other. The invention resides in adding a conventional mechanical vapour compression cycle in addition to an adsorption cycle.

The present invention utilizes a mechanical vapour compression system for cooling the adsorber bed and heating the desorber bed completely, thereby eliminating external cooling and heating for the adsorbers. Cooling load is extracted from the evaporator of the adsorption cycle. The evaporation temperature of the MVC cycle is raised to adsorption temperature (29-34° C.) whilst condenser of the refrigeration occurs at desorption temperature. The system has two separate refrigerant circuits namely one for adsorption cycle and the other the MVC cycle.

The major advantages of the present invention are:
(1) the cycle is completely portable without relying on external heat source,
(2) less complexity with minimum employment of water valves and pumps since the mechanical vapour compression cycle provides simpler yet efficient switching mechanism,
(3) the scalability of the system from small capacity such as 0.5 Rton to megawatt scale and
(4) environmental friendliness since the refrigerant for both mechanical vapour compression cycle and adsorption cycle can be from natural refrigerants such as water or other green refrigerants.

It is understood that variations and modifications of the above discussed disclosure are deemed incorporated herein and form a part of the invention.

REFERENCES

[1] Tulapurkar C, Khandelwal R, Centre T. Transient Lumped Parameter Modeling For Vapour Compression Cycle Based * Corresponding Author. Refrig Air Cond 2010:1-8.
[2] Lepore R, Remy M, Dumont E, Frere M. Dynamic lumped-parameter model of a heat pump designed for performance optimization. Build Simul 2012; 5:233-42. doi:10.1007/s12273-012-0080-9.
[3] He X-D, Liu S, Asada H H. Modeling of Vapor Compression Cycles for Multivariable Feedback Control of HVAC Systems. J Dyn Syst Meas Control 1997; 119:183. doi:10.1115/10.2801231.
[4] Rao Y V C. An introduction to thermodynamics. Universities Press; 2004.
[5] Chua H T, Toh H K, Ng K C. Thermodynamic modeling of an ammonia-water absorption chiller. Int J Refrig 2002; 25:896-906. doi:10.1016/50140-7007(01)00101-3.
[6] Thu K, Ng K C, Saha B B, Chakraborty A, Koyama S. Adsorption desalination: Theory & Experiments. Thesis. National University of Singapore, 2009. doi:10.1016/j.ijheatmasstransfer.2008.10.012.
[7] Saha B B, EI-Sharkawy I I, Shahzad M W, Thu K, Ang L, Ng K C. Fundamental and application aspects of adsorption cooling and desalination. Appl Therm Eng 2015; 97:68-76. doi:10.1016/j.applthermaleng.2015.09.113.
[8] Ng K C. Recent developments in heat-driven silica gel-water adsorption chillers. Heat Transf Eng 2003; 24:1-3. doi:10.1080/01457630304072.
[9] Gordon 1M, Ng K C. A general thermodynamic model for absorption chillers: Theory and experiment. Heat Recover Syst CHP 1995; 15:73-83.
[10] Ng K C, Tu K, Chua H T, Gordon J M, Kashiwagi T, Akisawa A, et al. Thermodynamic analysis of absorption chillers: internal dissipation and process average temperature. Appl Therm Eng 1998; 18:671-82. doi:10.1016/s1359-4311(97)00119-1.

The invention claimed is:

1. A device with a refrigeration or heat pump cycle comprising a combination of a mechanical vapour compression cycle section and an adsorption cycle section, the device further comprising:
   an adsorption cycle section including two or more adsorption/desorption beds connected for passage therethrough of a first working fluid capable of being adsorbed and/or desorbed in said two or more adsorption/desorption beds, said adsorption/desorption beds being connected for passage of said first working fluid to an evaporator and to a condenser through one or more dedicated direction altering valves operable in an alternating manner to provide an adsorption/desorption heat transferring cycle;
   a mechanical vapour compression cycle section including a mechanical vapour compressor configured to compress a second working fluid which is a mechanical vapour compression ("MVC") refrigerant, and connected to an opposite heat exchanger side of the said two or more adsorption/desorption beds, which alternatively act as a condenser and evaporator of the mechanical vapour compression cycle section, the condenser providing regeneration heat to the desorber bed of the adsorption cycle section, and the evaporator providing cooling to the adsorber bed of the adsorption cycle section, wherein the mechanical vapour compression cycle section provides useful heat for desorption and/or cooling for adsorption in the adsorption cycle section.

2. The device as claimed in claim 1 wherein a mechanical input is provided to pump heat comprising adsorption and/or desorption heat, in part or in full.

3. The device as claimed in claim 2 wherein a mechanical input is provided to pump into the adsorber bed heat for desorption in a full or in a partial heat recycling mode.

4. The device as claimed in claim 1 wherein heat is pumped from both the adsorber and the desorption condenser.

5. The device as claimed in claim 1 wherein the mechanical vapour compression cycle refrigerant carries heat of adsorption in partial heat pumping configuration, and condensation in full heat recirculation mode, pumped to the bed then currently used for desorption.

6. The device as claimed in claim 1 wherein an adsorbent pair for the adsorption cycle is selected from the group consisting of silica gel+water, activated carbon+ethanol, activated carbon+methanol and activated carbon+HFCs and the operating pressure is in the range from vacuum to high pressure.

7. The device as claimed in claim 1 wherein a mechanical pump, used to recycle heat in the adsorption cycle, is selected from the group consisting of centrifugal compressors, screw compressors, reciprocating compressors and scroll compressors.

8. The device as claimed in claim 1 wherein the refrigerant in the MVC comprises a conventional refrigerant or a mixture of conventional refrigerants.

9. The device as claimed in claim 1 wherein the dedicated direction altering valves for altering flow of the MVC refrigerant thereby enabling direction change between adsorption and desorption beds, is a 4-way valve.

10. The device as claimed in claim 1 wherein an external cooling medium via a heat exchanger is provided for refrigerant sub-cooling.

11. The device as claimed in claim 1 wherein a heat carrier circuit or energy storage is provided to enable heat exchange between the adsorption cycle and the vapour compression cycle.

12. The device as claimed in claim 1 wherein energy storage is provided comprising a cold/heat tank.

13. The device as claimed in claim 1 wherein the sorption processes are controlled by adjustment of refrigerant flowing direction within the mechanical vapour compression cycle.

14. The device as claimed in claim 1 wherein operation of the adsorber and desorber are controlled through control of refrigerant flow control connecting the adsorption and desorption beds with the condenser and the evaporator.

15. The device as claimed in claim 1 wherein the adsorption cycle comprises two or more adsorber beds.

16. The device as claimed in claim 15 wherein refrigerant is distributed for cooling and heating to the adsorber beds thereby realizing adsorption and desorption processes.

17. The device as claimed in claim 1 wherein condenser heat from the adsorption cycle is rejected externally by cooling water.

18. The device as claimed in claim 1 wherein condenser heat from the adsorption cycle is rejected externally by air.

19. The device as claimed in claim 1 which constitutes a chiller device, a split air conditioning unit, or a refrigeration unit.

20. A method for heat pump operation in a device with a refrigeration or heat pump cycle comprising a combination of a mechanical vapour compression cycle and an adsorption cycle, the method comprising:

passing a first working fluid capable of being adsorbed and/or desorbed in said through two or more adsorption/desorption beds, said adsorption/desorption beds being connected for passage of said first working fluid to an evaporator and to a condenser through one or more dedicated direction altering valves operable in an alternating manner to provide an adsorption/desorption heat transferring cycle;

mechanically compressing a second working fluid which is a mechanical vapour compression ("MVC") refrigerant, and passing the MVC refrigerant to an opposite heat exchanger side of the said two or more adsorption/desorption beds, which alternatively act as a condenser and evaporator of the mechanical vapour compression cycle, the condenser providing regeneration heat to the desorber bed of the adsorption cycle, and the evaporator providing cooling to the adsorber bed of the adsorption cycle, wherein the heat pump cycle provides the useful heat (adsorption and desorption heat) effect for the adsorption cycle, the method comprising employing the mechanical vapour compression means to pump heat in the process to the sorption processes to regenerate the adsorbent therein, thereby providing an enhanced performance.

21. The method as claimed in claim 20 wherein the heat, in part or in full is pumped with a mechanical input.

22. The method as claimed in claim 20 wherein adsorber heat for desorption in full or in partial heat recycling mode is pumped mechanically.

23. The method as claimed in claim 20 wherein heat from both the adsorber and the condenser is pumped for desorption.

24. The method as claimed in claim 20 wherein heat of adsorption in full, or partially, and condensation in full heat recirculation mode, are pumped to the desorption process through the MVC refrigerant.

25. The method as claimed in claim 20 wherein an adsorbent pair for the adsorption cycle is selected from the group consisting of silica gel+water, activated carbon+ethanol, activated carbon+methanol and activated carbon+HFCs and the operating pressure is in the range of from vacuum to high pressure.

26. The method as claimed in claim 20 wherein a mechanical pump to recycle heat from the adsorption cycle is selected from the group consisting of centrifugal compressors, screw compressors, reciprocating compressors and scroll compressors.

27. The method as claimed in claim 20 wherein the MVC refrigerant comprises a conventional refrigerant or a mixture of conventional refrigerants such as R134a, R410a, $CO_2$, HFO-1234ze(E), HFO-1234yf.

28. The method as claimed in claim 20 wherein heat pump direction change between adsorption and desorption beds is effected through dedicated direction altering valves for flow of refrigerant.

29. The method as claimed in claim 20 wherein, refrigerant is subjected to sub-cooling through an external cooling mechanism via a heat exchanger.

30. The method as claimed in claim 20 wherein, heat exchange between adsorption cycle and mechanical vapour compression cycle is enabled through a heat carrier circuit or energy store.

31. The method as claimed in claim 20 wherein refrigerant flow and sorption process are controllable through dedicated controls.

32. The method as claimed in claim 20 wherein pressure equalization is maintained between the high pressure and low pressure sides of the mechanical vapour compression (MVC) cycle for energy recovery and for the protection of the compressor.

33. The method as claimed in claim 20 wherein sub-cooling of the refrigerant is attained by using some cooling energy from the evaporator of the adsorption cycle via chilled water running across a sub-cooling heat exchanger.

34. The method as claimed in claim 20 wherein sub-cooling of the refrigerant is achieved by using some cooling energy from the evaporator of the adsorption cycle with a separate heat exchanger submerged inside the evaporator of the adsorption cycle and heat carrier circuit running across that heat exchanger and a sub-cooling heat exchanger.

35. The method as claimed in claim 20 wherein sub-cooling of the refrigerant is obtained by expanding a part of the refrigerant of the MVC cycle.

36. The method as claimed in claim 20 wherein an intermediary medium/media is utilized to exchange heat between the adsorption cycle and the MVC cycle.

37. The method as claimed in claim 20 wherein operation interval/timings for the sorption processes are controlled by adjustment of refrigerant flowing direction of the MVC cycle.

38. The method as claimed in claim 20 wherein a pre-conditioning interval or schedule of the adsorber and the desorber is controlled via alteration of vapour valves commuting sorption heat exchangers and a respective evaporator and condenser of the adsorption cycle.

39. The method as claimed in claim 20, wherein the adsorption cycle comprises two or more adsorber beds.

40. The method as claimed in claim 39 wherein refrigerant for heating or cooling for desorption and adsorption effects respectively are distributed to respective adsorber beds.

41. The method as claimed in claim 20 wherein condenser heat from the adsorption cycle is rejected externally by cooling water.

42. The method as claimed in claim 20 wherein condenser heat from the adsorption cycle is rejected externally by air.

43. The method as claimed in claim 20 wherein sub-cooling of the refrigerant is attained by using air via a sub-cooling heat exchanger.

* * * * *